United States Patent [19]

Zimmerman et al.

[11] Patent Number: 5,107,563
[45] Date of Patent: Apr. 28, 1992

[54] NON STICK WINDSHIELD WIPERS

[76] Inventors: Bernard Zimmerman, 20 Blenheim Rd., Englishtown, N.J. 07726; George Spector, 233 Broadway RM 3815, New York, N.Y. 10007

[21] Appl. No.: 584,539

[22] Filed: Sep. 18, 1990

[51] Int. Cl.$^5$ .............................................. B60S 1/04
[52] U.S. Cl. ............................. 15/250.36; 15/250.42
[58] Field of Search .......... 15/250.36, 250.40, 250.41, 15/250.42

[56] References Cited
U.S. PATENT DOCUMENTS

| | | | |
|---|---|---|---|
| 2,324,365 | 7/1943 | Coutts | 15/250.41 |
| 3,122,771 | 3/1964 | Dale | 15/250.36 |
| 3,545,028 | 12/1970 | Poland | 15/250.36 |
| 4,030,159 | 6/1977 | Centoducati | 15/250.36 |
| 4,208,758 | 6/1980 | Timmis et al. | 15/250.36 |
| 4,622,712 | 11/1986 | Sugita et al. | 15/250.36 |
| 4,649,593 | 3/1987 | Gilliam III et al. | 15/250.36 |

Primary Examiner—Harvey C. Hornsby
Assistant Examiner—Gary K. Graham

[57] ABSTRACT

A nonstick windshield wiper blade for a windshield wiper that is suitably mounted on a windshield of a motor vehicle is provided and consists of the wiper blade having a TEFLON tip so that ice and snow can be better removed from the windshield when the windshield wiper is in operation.

1 Claim, 1 Drawing Sheet

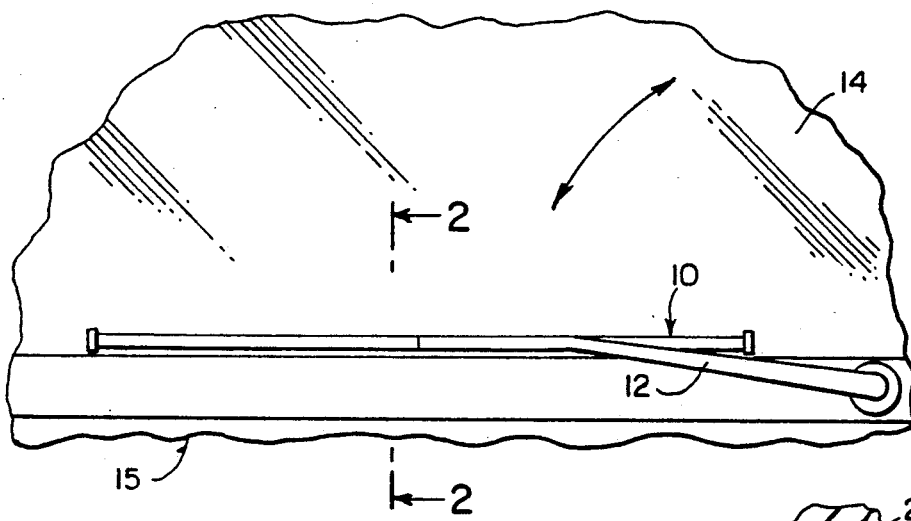
Fig. 1
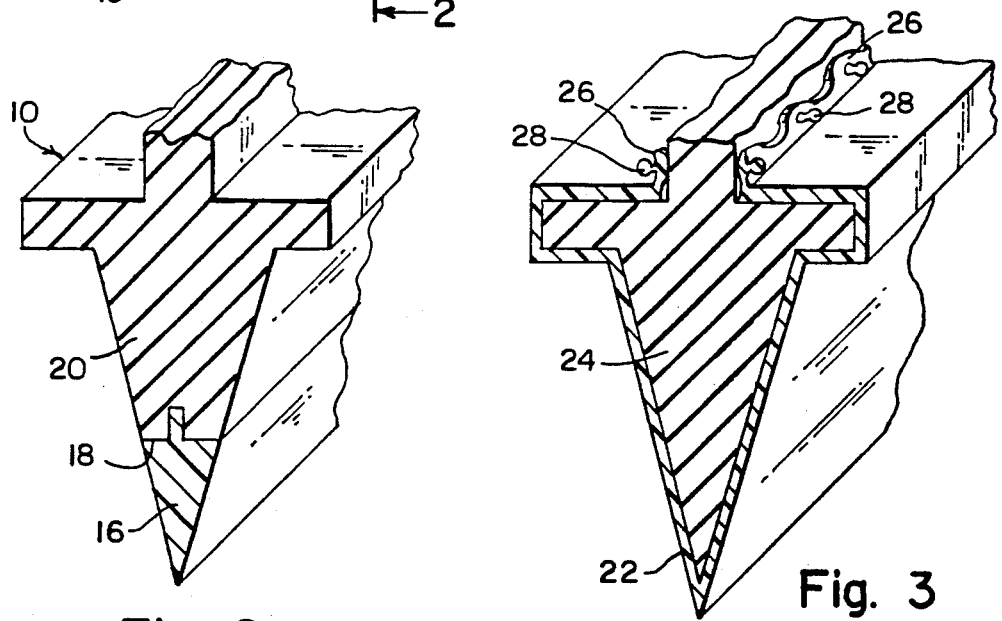
Fig. 2
Fig. 3

5,107,563

NON STICK WINDSHIELD WIPERS

BACKGROUND OF THE INVENTION

The instant invention relates generally to vehicle windshield cleaning systems and more specifically it relates to a nonstick windshield wiper blade which provides a better removal of ice and snow from a windshield.

There are available various conventional vehicle windshield cleaning systems which do not provide the novel improvements of the invention herein disclosed.

SUMMARY OF THE INVENTION

A primary object of the present invention is to provide a nonstick windshield wiper blade that will overcome the shortcomings of the prior art devices.

Another object is to provide a nonstick windshield wiper blade in which a elastomeric TEFLON tip portion is bonded to an upper rubber portion of the wiper blade so that ice and snow can be better removed from a windshield.

An additional object is to provide a nonstick windshield wiper blade in which a TEFLON cover shield engages a standard wiper blade so that the ice and snow can be better removed from a windshield.

A further object is to provide a nonstick windshield wiper blade that is simple and easy to use.

A still further object is to provide a nonstick windshield wiper blade that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a front elevational view of a portion of a windshield of a motor vehicle showing a windshield wiper with the invention installed thereon.

FIG. 2 is an enlarged cross sectional perspective view of the wiper blade as indicated by line 2—2 in FIG. 1, showing the elastomeric TEFLON tip portion bonded to the upper rubber portion of the wiper blade.

FIG. 3 is an enlarged cross sectional perspective view similar to FIG. 2, showing a modification in which an inwardly spring biased TEFLON cover shield engages the standard rubber wiper blade, in which a series of individual suction cups with pull/push tabs are provided for quick attachment to and removal from the wiper blade.

DETAILED DESCRIPTION OF THE PREFERRED EMBODIMENTS

Turning now descriptively to the drawings, in which similar reference characters denote similar elements throughout the several views. FIGS. 1 and 2 illustrate a nonstick windshield wiper blade 10 for a windshield wiper 12 that is suitably mounted on a windshield 14 of a motor vehicle 15. The blade 10 consists of an elastomeric polytetrafluoroethylene tip portion 16, otherwise know as TEFLON, bonded to the underside 18 of an upper rubber portion 20 forming the wiper blade 10 so that ice and snow can be better removed from the windshield 14 when the windshield wiper 12 is in operation.

FIG. 3 shows a modification in which an inwardly spring biased polytetrafluoroethylene cover shield 22 is in engagement with the standard rubber wiper blade 24 of the windshield wiper 12. The cover shield 22 has a series of individual suction cups 26 with push/pull tabs 28 for quick attachment to and removal from the standard rubber wiper blade 24. Ice and snow can be better removed from the windshield 14 when the windshield wiper 12 is in operation.

Polytetrafluoroethylene (TEFLON) is a substance made from the polymer derived from fluorine and because of its extreme inertness it does not become wet in contact with water. It is a waxy, opaque-white, thermoplastic resin, thermally stable, resistant to acids, alkalis and oxidizing agents since it has an extremely low coefficient of friction polytetrafluoroethylene is an ideal substance to be used in fabricating windshield wiper blades.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A nonstick windshield wiper blade for a windshield wiper that is suitably mounted on a windshield of a motor vehicle, comprising a wiper blade with an upper flange in combination with an inwardly biased polytetrafluoroethylene cover shield mounted on said wiper blade, said cover shield having spring-like resiliency and having an upper portion in engagement with said flange and a series of suction cups mounted on said upper portion with tabs for quick attachment of said cover to and removal from said wiper blade, whereby ice and snow can be better removed from the windshield when the windshield wiper is in operation.

* * * * *